United States Patent [19]

Nam et al.

[11] Patent Number: 5,233,411
[45] Date of Patent: Aug. 3, 1993

[54] FIELD-INTERPOLATION CIRCUIT AND METHOD FOR IMAGE PROCESSING

[75] Inventors: Seok H. Nam, Seoul; Young M. Lee, Suweon, both of Rep. of Korea

[73] Assignee: SamSung Electronics Co., Ltd., Kyungki, Rep. of Korea

[21] Appl. No.: 760,893

[22] Filed: Jul. 17, 1991

[30] Foreign Application Priority Data

Sep. 19, 1990 [KR] Rep. of Korea .................. 90-14825

[51] Int. Cl.[5] ............................................. H04N 7/12
[52] U.S. Cl. .................................... 358/75; 358/105; 358/133; 358/107; 360/35.1
[58] Field of Search ............... 358/133, 105, 107, 141, 358/75, 426, 428, 443, 447, 444, 479; 360/35.1, 32, 33.1

[56] References Cited

U.S. PATENT DOCUMENTS

| | | | |
|---|---|---|---|
| 4,468,693 | 8/1984 | Fujita et al. | 358/75 |
| 4,494,140 | 1/1985 | Michael | 358/105 |
| 4,546,386 | 10/1985 | Matsumoto et al. | 358/105 |
| 4,679,084 | 7/1987 | Topper et al. | 358/105 |
| 4,709,264 | 11/1987 | Tamura et al. | 358/107 |
| 4,764,805 | 8/1988 | Rabbani et al. | 358/133 |
| 4,816,929 | 3/1989 | Bradley et al. | 360/35.1 |
| 4,847,701 | 7/1989 | Suesada | 360/33.1 |
| 4,891,715 | 1/1990 | Levy | 360/33.1 |
| 4,984,077 | 1/1991 | Uchida | 358/105 |
| 5,055,940 | 10/1991 | Tomatsuri | 358/443 |
| 5,122,876 | 6/1992 | Aoki | 358/105 |
| 5,144,427 | 9/1992 | Kitaura et al. | 358/105 |

Primary Examiner—Edward L. Coles, Sr.
Assistant Examiner—Jerome Grant, II
Attorney, Agent, or Firm—Robert E. Bushnell

[57] ABSTRACT

A field interpolation circuit of an image signal is provided for preventing a playback screen from trembling due to the difference of the image signals between fields, when photographing and recording a fast moving object by one frame in a digital still video camera, wherein the image signal for one frame is recorded by a first field signal which is generated by photographing a fast moving object and a second field signal which is converted from the first field signal according to the structure of the CCD (Charge Coupled Device), so that the playback screen is very stable without trembling since the recording is carried out by only one field image.

10 Claims, 9 Drawing Sheets

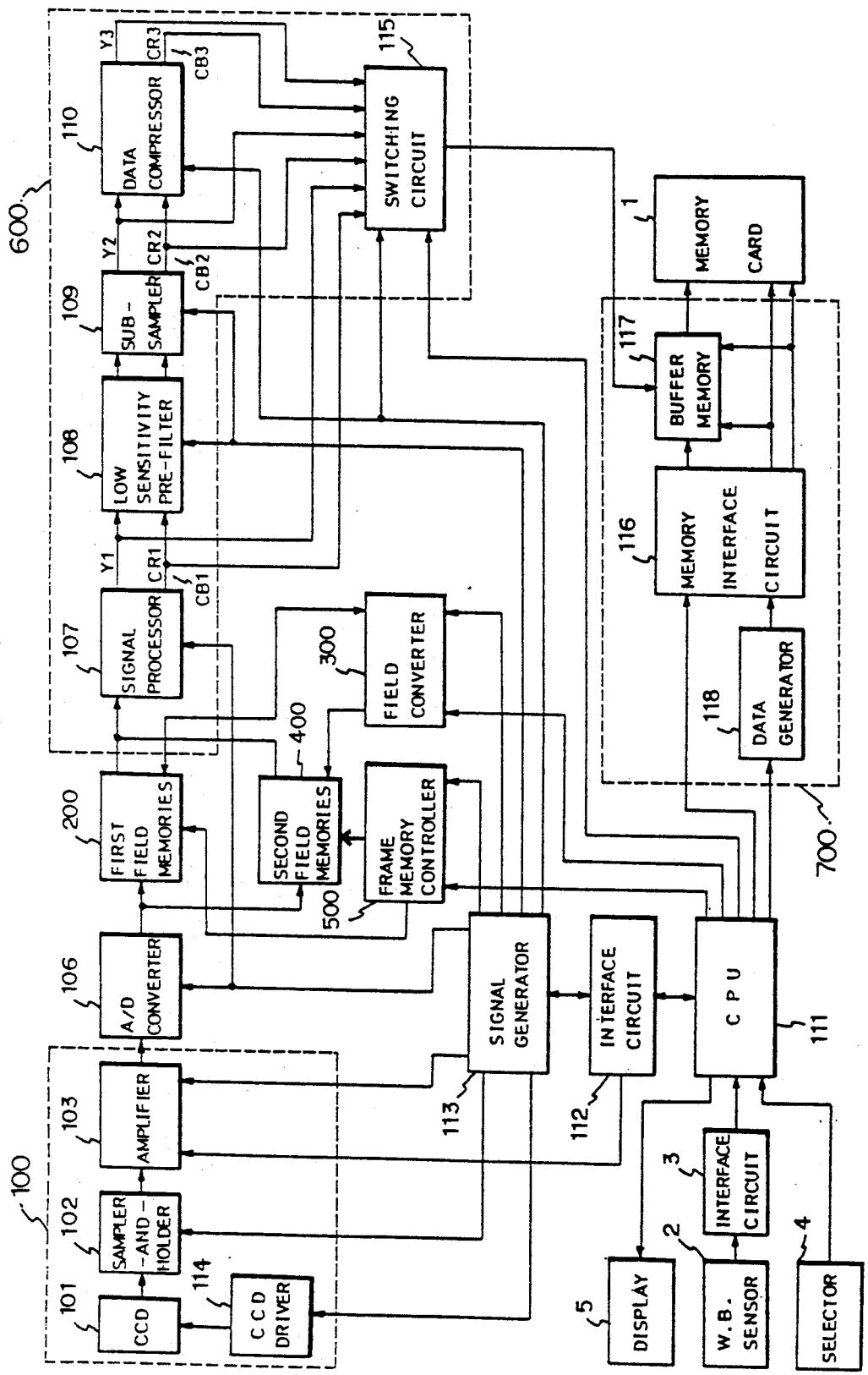

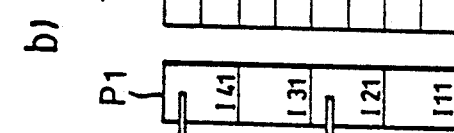
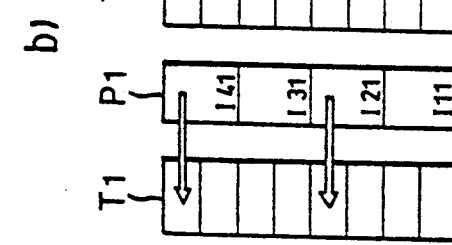
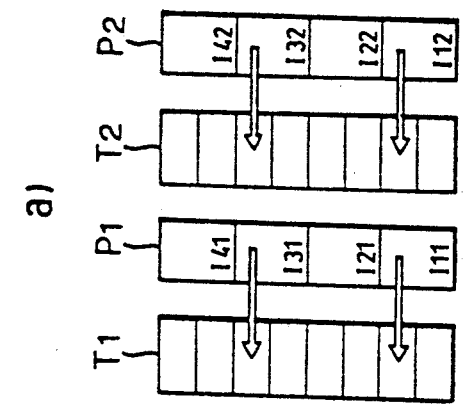
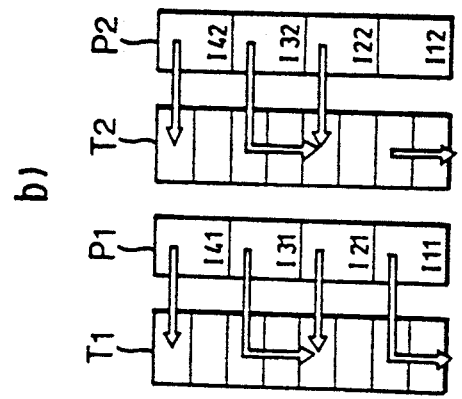
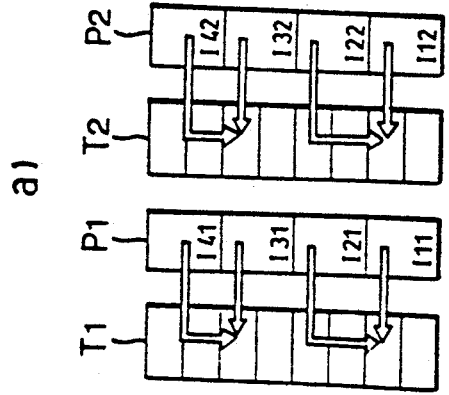
FIG. 8

FIELD-INTERPOLATION CIRCUIT AND METHOD FOR IMAGE PROCESSING

BACKGROUND OF THE INVENTION

The present invention relates to image processing circuits and more particularly to, a field-interpolation circuit for preventing the tremble of a screen in playing back a recorded image signal, by means of processing a frame of image signal by one-field photography and recording it when photographing a fast moving object in a digital still video camera.

The digital still video camera system comprises a camera as shown in FIG. 1 and a player as shown in FIG. 2.

The digital still video camera shown in FIG. 1 is an apparatus for converting a photographed image signal to a digital data and recording it into a memory card 1 for use as a recording medium, and the digital still video player shown in FIG. 2 is an apparatus for reading out an image signal recorded in the memory card 1 and displaying it on a television monitor.

When an object is photographed, a focusing can be achieved by manipulation of a lens, similar to conventional cameras, and a shutter speed can also be selected among many choices, although these functional blocks are not shown in FIG. 1.

As the shutter, an electronic shutter of which the speed is controlled by the charge storage time of a charge coupled device (CCD) 101 is widely used.

FIG. 1 shows the camera circuit diagram of a conventional digital still video camera system comprising a memory card 1, a white balance (WB) sensor 2, a first interface circuit 3, a selector 4, a display 5, a central processing unit (CPU) 111, a second interface circuit 112, a signal generator 113, a photographing means 100, a gamma and WB compensating circuit 104, a low pass filter (LPI) 105, an analog-to-digital (A/D) converter 106, a signal converting device 600, and a recording device 700.

In FIG. 1, the photographing device 100 comprises a CCD 101, a sampler-and-holder 102, an amplifier 103, and a CCD driver 114.

The signal converting device 600 comprises a signal processor 107, a low-sensitivity pre-filter 108, a sub-sampler 109, a data compressor 110, and a switching circuit 115.

Also, the recording device comprises a memory interface circuit 116, a buffer memory 117, and a data generator 118.

FIG. 2 shows the player circuit diagram of a conventional digital still video camera system.

Now the operation of a total system is briefly described with reference to FIG. 1 and FIG. 2.

First, if an user turns on the power of the camera circuit shown in FIG. 1, a message representing a present state of the camera appears on the display 5.

Subsequently, if the user presses a release button (not shown in figures) by a half after selecting a desirable photographic mode using the selector 4, the CPU 111 recognizes this selection and provides electronic powers to each electronic circuit.

Then if an exposure sensor measures the intensity of an incident light 6 and transmits the measured result to the CPU 111, the CPU 111 controls an iris according to the measured intensity data (this is well known and thus is not shown in FIG. 1 and FIG. 7).

Also, an external color temperature is measured by the WB sensor 2; and this measured data is provided as information for white balance to the CPU 111 through the first interface circuit 3.

In this state, if the release button is completely pressed, the CPU 111 operates the shutter and performs the photographing and signal-processing operation by controlling the signal generator 113 according to the information for the white balance and the exposed light intensity.

Then the signal generator 113 provides control signals to the CCD driver 114, the sampler-and-holder 102, the amplifier 103, the gamma and WB compensator 104, the A/D converter 106, the data compressor 110, and the switching circuit 115, according to the shutter speed under control of the CPU 111.

Then, the CCD 101 photographs the object and provides the image signal by an optical-to-electrical conversion, driven by the CCD driver, and this image signal is applied to the gamma and WB compensator 104 through the sampler-and-holder 102 and the amplifier 103.

The gamma and WB compensator 104 performs the gamma and WB compensation of the image signal by the control of the CPU 111 through the second interface circuit 112.

This compensated image signal is filtered by the LPF 105 and is subsequently converted to a digital image signal by the A/D converter 106.

The digital image signal is divided into a luminance signal Y1 and color-difference signals CR1 and CB1 by the signal processor 107.

On the other hand, since the image signal from the CCD 101 is not time-continuous, it is converted to a time-continuous signal by the sampler-and-holder 102 and is subsequently applied to the amplifier 103.

In another words, a signal, as shown in FIG. 3(B), provided from the CCD 101 which is driven by a CCD driving clock, as shown in FIG. 3(A) provided from the CCD driver 114, (i.e., a difference between a reference potential and a stored charge potential of each pixel of the CCD 101) is held during one period of the CCD driving clock by the sampler-and-holder 102 as shown in FIG. 3(C).

The amplifier 103 amplifies the output signal of the sampler-and-holder 102 up to an input signal level of the A/D converter 106.

Then the A/D converter 106 samples the output signal of the sampler-and-holder (FIG. 3(C)) 102 which is applied through the LPF 105, during the high or low level of a control signal of the signal generator 113, i.e., a sampling clock shown in FIG. 3D, and converts it to the digital image signal.

The digital signal is divided into the luminance signal Y1 and the color-difference signals CR1 and CB1 by the signal processor 107 and they are filtered by the low-sensitivity pre-filter 108 according to the selected mode.

Subsequently, the data of the filtered signals are compressed by the sub-sampler 109 and the data compressor 110.

The low-sensitivity pre-filter 108 is a digital filter for preventing the aliasing resulting from the sub-sampling of the sub-sampler 107. The low-frequency prefilter 108 is used to remove frequency components above half a sub-sampling frequency of the luminance signal Y1 and the color difference signals CR1 and CB1.

As for the low-sensitivity pre-filter, a FIR filter is use since it has no group delay.

The sub-sampler 109 compresses the data of the luminance signal Y1 and the color-difference signal CR1 or CB1 filtered by the low-sensitivity pre-filter 108 by a half line offset sub-sampling.

Subsequently, the data compressor 110 further compresses the sub-sampled data by a conventional data compression method, reducing the number of necessary bits per pixel.

The conventional data compression method, used can be a transform coding method delta pulse code modulation method (DPCM), an adaptive delta pulse code modulation method (ADPCH) and so on.

The sample points of the output of the signal processor 107 are shown in FIG. 4, while the sample points of the output of the sub-sampler 109 are shown in FIG. 5.

On the other hand, before the photograph of the object, the user can select a data format to be recorded into the memory card 1 by manipulation of the selector 4.

Among many modes having different screen qualities, desired mode is selected and, according to the selected mode, the amount of digital data for one frame of a still image is changed, i.e., the number of frames of the still image to be recorded into the memory card 1 can be changed.

The selector 4 can select between one of a first to a fourth mode and, according to the mode selection of the selector 4, the CPU 111 controls the signal generator 113, the switching circuit 115, and the memory interface circuit 116, for recording the image signal with the different data amount to the memory card 1 through the buffer memory 117 as wells as the control signal such as a data compression mode signal and an address signal.

For example, when the memory capacity of one memory card is 18 Mbit and the amount of data for one frame of image signal is 6 Mbit, the data recording into the memory card 1 according to each mode is as follows.

First, if the first mode is selected, the output of the signal processor 107 is provided from the switching circuit 115 and is recorded into the memory card without the data compression.

Thus, in the first mode case, three frames of the image signal, i.e., three sheets of the still images can be recorded.

Second, if the second mode is selected, the output of the sub-sampler 109 is provided from the switching circuit 115 and is recorded into the memory card 1.

In this case, the amount of the recorded data is 3 Mbit corresponding to half of the amount of the output data of the signal processor 107 for each game since the output of the sub-sampler 109 is the sub-sampled data as shown in FIG. 5.

Thus, in the second mode case, six frames, i.e., six sheets of still images can be recorded.

Third, if the third mode or fourth mode is selected, the output of the data compressor 110 is provided from the switching circuit 115 and is recorded into the memory card 1.

The data compressor compresses the input data by a factor of ½ in the third mode, while compressing it by a factor of ¼ in the fourth mode.

Thus, if the third mode is selected, the amount of the data recorded into the memory card 1 is 1.5M bit corresponding to one fourth of the amount of the output data of the signal processor 107.

Thus, in the third mode case, twelve frames, i.e., twelve sheets of still images can be recorded.

On the other hand, in the fourth mode case, the amount of the data recorded into the memory card 1 is 750K bit corresponding to ⅛ of the output data of the signal processor 107.

Thus, twenty four frames, i.e., twenty four sheets of still images can be recorded.

If, as the data compression method, a discrete cosine transform (DCT) that minimizes the redundancy of the image data is used, the data compression can be performed without degradation of image quality even to about 1/20 of the amount of the output of the signal processor 107 so that some modes to more compress the data can be established.

On the other hand, as the information being recorded into the memory card 1, there is also provided a screen number from the data generator 118 by the control of the CPU 111 and other wanted data to be recorded onto a particular image, as well as the image data.

Now the operation of the digital still video player, shown in FIG. 2, for playing back the image data recorded in the memory card 1 by the digital still video camera circuit shown in FIG. 1, is described in detail.

If the user inserts the memory card 1 into the digital still video player shown in FIG. 2 and assigns a file number (an image number) by manipulation of a key board 213, the CPU 201 reads the information of directory regions of the memory card 1 through a card interface circuit 202.

Then the CPU 201 classifies information for the assigned file number to check the recognition of the image data, the image processing method and the data compression mode. Accordingly, in response to this information, the CPU 201 controls a signal processing path.

To describe this in detail, a mode signal is provided from the card interface circuit 202 according to the information in the memory card 1 and is applied to a decision circuit 211 via the CPU 201.

Then the decision circuit 211 decides the data compression mode and, according to the decided mode, controls a switch 205 to connect the output signal of either a data reconstruction circuit 203 or a card interface circuit to an interpolation circuit 206.

For example, if the selected file is an image which was recorded in the third or fourth mode by the digital still video camera circuit shown in FIG. 1, the data provided from the card interface circuit 202 is extended by a factor of 2 or 4 and is subsequently reconstructed by the data reconstruction circuit 203.

The reconstructed data is applied to the interpolation circuit 206 through the switch 205.

Then the data is interpolated by the interpolation circuit 206 and is divided into a luminance signal Y and two color-difference signals CR and CB.

These signals are provided to a frame memory 207 so that one frame of data is recorded.

On the other hand, if the selected file is an image which was recorded in the first or second mode, the data provided from the card interface circuit 202 is applied directly to the interpolation circuit 206 through the switch 205, without passing the data reconstruction circuit 203.

Similarly, the data is interpolated by the interpolation circuit 206 and the luminance signal Y and the color-difference signals CR and CB are provided to the memory 207, recording one frame of data.

Also, other data such as the control data provided from the card interface circuit 202 as well as the image data is recorded into the frame memory 207 through a data circuit 204.

After one frame of data is recorded into the frame memory 207, the luminance signal Y and the color-difference signals CR and CB are converted to an analog signal by a D/A converter 209, in synchronous with a clock provided from the signal generator 215 which is controlled by the CPU 201.

The output signals of the D/A converter 209 become smooth by low pass filters (not shown in FIG. 2) and are respectively applied to an encoder and matrix circuit 210.

Then the outputs of the D/A converter 209 are converted to a composite image signal or R(Red), G(Green), and B(Blue) components by the encoder and matrix circuit 210 and these signals are displayed on a monitor.

As described hereinabove, when the video still camera shown in FIG. 1 photographs the object with the CCD 101 for use as the image device, a first field is photographed for 1/60 seconds and subsequently a second field is photographed for the next 1/60 seconds.

At that time, if a fast moving object is photographed, the first field is photographed at a position S as shown in FIG. 6(A), while the second field is photographed at another position s' as shown in FIG. 6(B).

Thus, if the photographed image is played back by the digital still video player shown in FIG. 2 and is displayed on the monitor 216, different screens are displayed every 1/60 seconds.

Thus, there is a problem that the screen is trembled with a period of 1/60 seconds. The present invention overcomes this problem and provide a field interpolation circuit and method thereof that prevent the tremble of a screen in playing back a recorded image signal, by means of generating one frame of image signal by one field photography in recording a fast moving object and recording it after signal processing.

According to the first aspect of the present invention, there is provided a field interpolation circuit, including a digital still video recorder for recording or playing back an image signal, the circuit comprising:

a memory card with a predetermined memory size for recording and playing back data, a selector for selecting a photography mode and a data compression mode, a CPU for controlling an overall system according to the mode selected by the selector, a signal generator, connected to the CPU through an interface circuit, for providing control signals according to the control of the CPU, a photographing means, including a photographing device, for photographing an object by using the photographing device according to the control signals from the signal generator and converting an photographed optical signal to an electrical signal and providing a continuous image signal by sampling-and-holding a time-incontinuous image signal, an A/D converter for converting the output signal of the photographing means to digital image signal according to the control signals of the signal generator;

a first field memory for storing and providing a first field of the digital image signal according to control signals;

a field converter for converting the first field image signal to a second field image signal by arithmetic operation according to the structure of the photographing device under control of the signal generator and the CPU;

a second field memory for selectively storing and providing the second field image signals provided from the A/D converter and the field converter according to control signals;

a frame memory controller for controlling the first and second field memories under control of the signal generator and the CPU;

a signal conversion device for dividing the image signal provided from the first and second field memories into a luminance signal and two color-difference signals according to the control signals of the signal generator and providing an image signal which has the different amount of data according to the mode selected by the selector, after low-sensitivity filtering, sub-sampling, and data compressing; and a recording device for recording the output image signal of the signal converting device as well as other image information into the memory card.

According to a second aspect of the present invention, there is provided a method for field-interpolation, including a CPU, a signals generator, a photographing means, an A/D converter, a second field memory, and frame memory controller, the method comprising:

a photographing process for photographing an object by using a photographing device such as CCD, and providing a first field image signal after converting the frame-stored charge of the photographing device to an electrical image signal;

a digital converting process for converting the first-field image signal in the photographing process to a digital image signal using the A/D converter;

a storing process for storing the digital first-field image signal in the digital converting process into the first field memory; a field interpolating process for emphasizing a larger correlative side of image signals on upper and lower horizontal lines adjacent to the first field image signal by logic arithmetic operation, and, for storing a second field image signal into the second field memory after converting the first field image signal to the second field image signal; and an output process for providing the first and second field image signals stored in the storing process and the field interpolating process.

BRIEF DESCRIPTION OF THE DRAWINGS

Figures 4, 5:
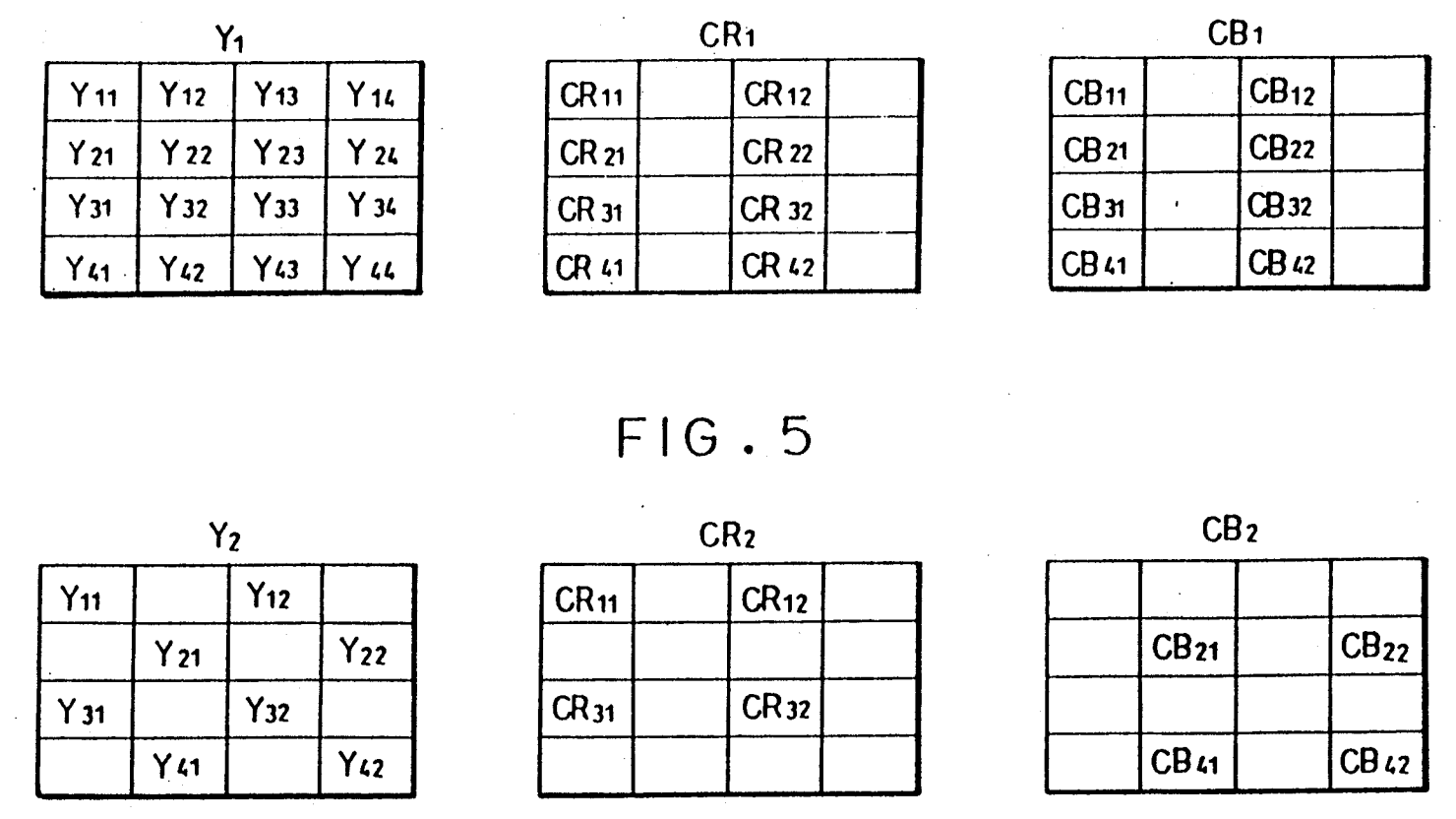

FIG. 4 shows the output waveforms of a signal processor 107 in FIG. 1.

FIG. 5 shows the output waveforms of a sub-sampler 109 in FIG. 1.

FIG. 7 is the circuit diagram of a digital still video camera according to the present invention.

FIGS. 8(A,B) show the field and frame storage of a CCD in FIG. 7 according to the present invention.

DETAILED DESCRIPTION OF THE INVENTION

Figure 1:
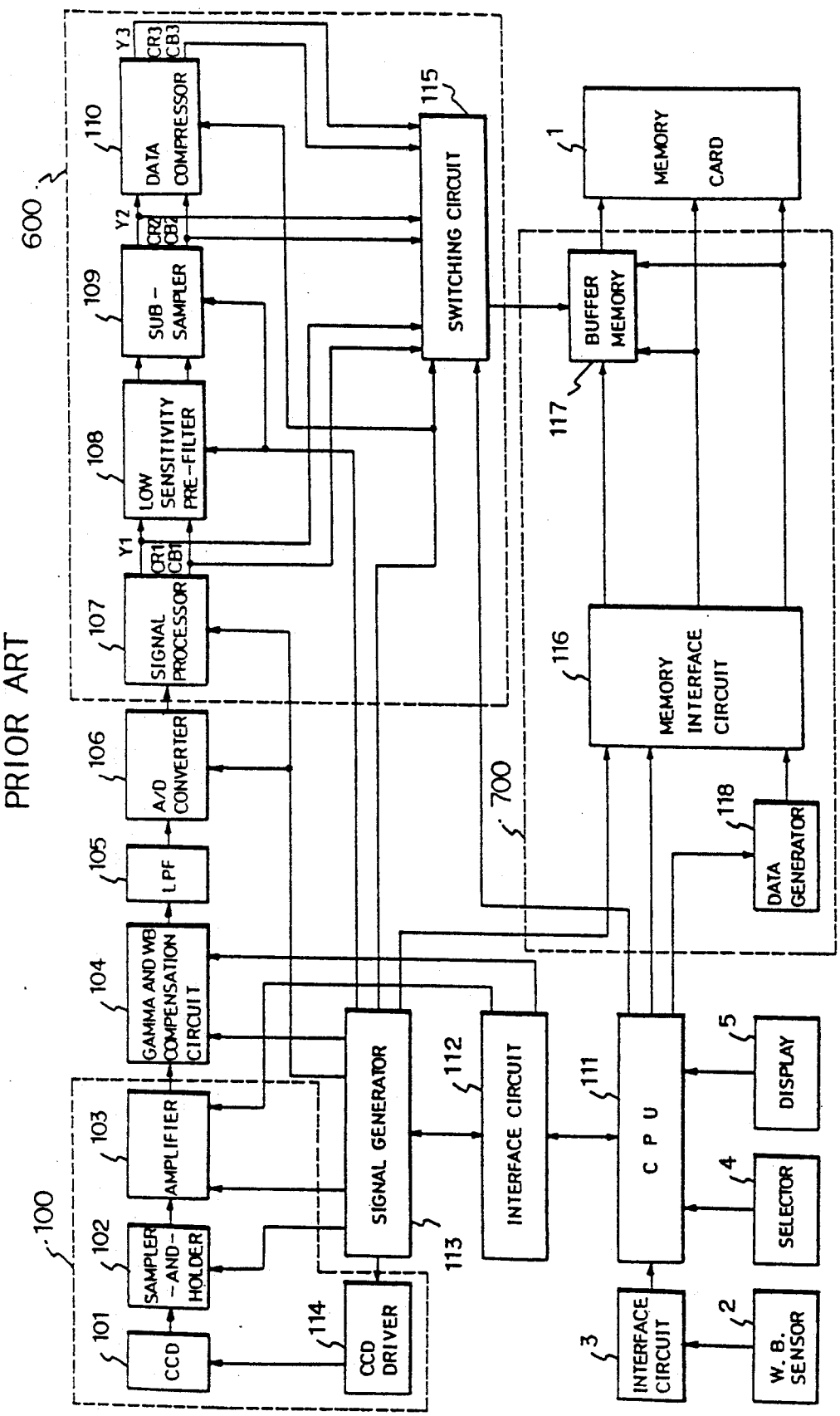
FIG. 1 is the circuit diagram of a conventional digital still video camera.

FIG. 7 shows the circuit diagram of a digital still video camera according to the present invention, comprising a memory card 1 with a predetermined memory size for recording or playing back data, a WB sensor 2 for measuring an external color temperature and for providing color temperature data and WB informations, and a first interface circuit 3 for transmitting these data, a selector 4 for selecting a photography mode and a data compression mode, a CPU 111 for controlling an entire system according to the WB information provided through the interface circuit 3 and the selected mode of the selector 4, a signal generator 113 connected to the CPU 111 through a second interface circuit 112, for providing control signals under control of the CPU 111, a photographing devices 100 including a frame or field storage structure of CCD 101, for photographing an object according to the control signals of the signal generator 113, and for providing a continuous image signal by sampling-and-holding of a time-incontinuous image signal, after optical-to-electrical conversion of the image signal, an A/D converter 106 for converting the image signal into a digital image signal according to the control signals of the signal generator 103, a first field memory 200 for storing and providing a first field image signal of the digital image signal from the A/D converter 106 according to the control signals, a field converter 300 for converting the first field image signal in the first field memory to a second field image signal by arithmetic operation according to the structure of the CCD 101, a second field memory 400 for storing and providing one of a second field image signal from the A/D converter 106 of the digital image signal and a second field image signal converted by the field converter 300, a frame memory controller 500 for controlling the first and second field memories 300 and 400 under control of the CPU 111, a signal converting device 600 for dividing the image signal provided from the first and second field memories 300 and 400 into a luminance signal Y1 and color-difference signals CR1 and CB1 according to the control signals of the signal generator 113, and for providing the different amount of the image signal data according to the selected mode of the selector 4 after low-sensitivity filtering, sub-sampling, and data compressing, and a recording device 700 for recording the output image signal of the signal converting device 600 and other image information into the memory card 1 under control of the CPU 111.

The photographing device is the same as that as shown in FIG. 1, which comprises a CCD 101, a sampler-and-holder 102, an amplifier 103, and a CCD driver 114.

The signal converting device 600 as shown in FIG. 7 is the same as that in FIG. 1, which comprises a signal processor 107, a low-sensitivity pre-filter 108, a sub-sampler 109, a data compressor 110, and a switching circuit 115.

The recording device 700 in FIG. 7 is also the same as that as shown in FIG. 1, which comprises a memory interface circuit 116, a buffer memory 117, and a data generator 118.

FIGS. 8(A,B) show the storage of field and frame of the CCD 101 in FIG. 7, in which (A) shows the generation of odd and even field image signals when the CCD 101 has the field storage structure and (B) shows them when the CCD 101 has the frame storage structure.

Figure 9A:
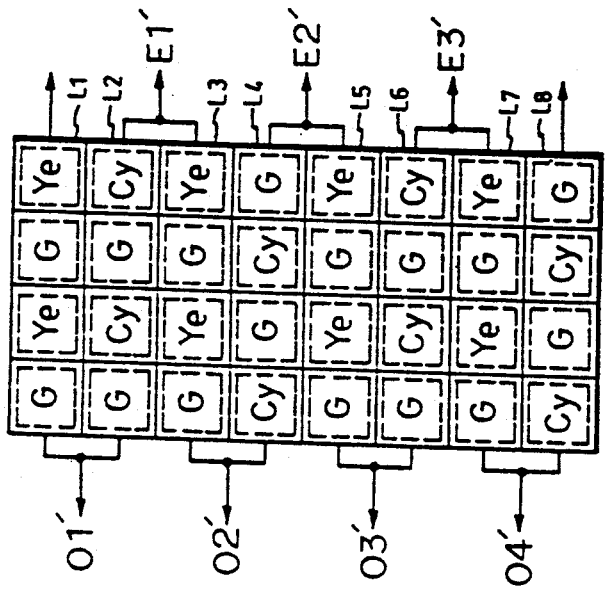
FIGS. 9(A,B) are examples of a frequency interleaving method of the CCD in FIG. 7.
Figure 9B:
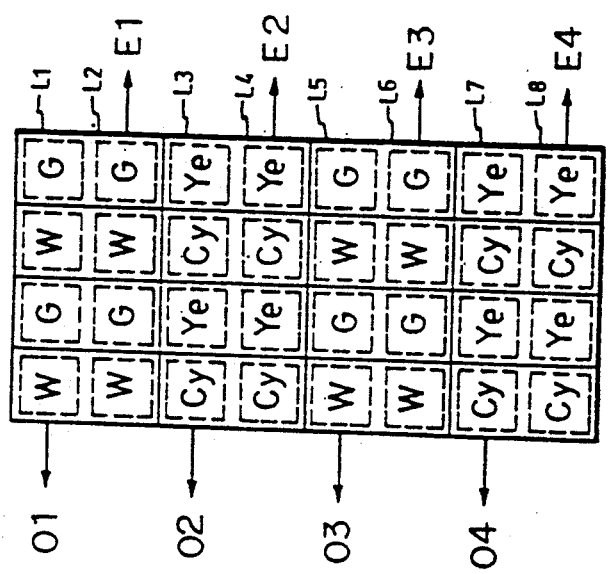

FIGS. 9(A,B) show an example of a scanning method according to a frequency interleaving method of the CCD 101, in which (A) is in the field storage structure case and (B) is in the frame storage structure case.

Now the detailed operation effect of the present invention shown in FIG. 7 is described referred to FIG. 8 and FIG. 9.

The conventional operation of the digital still video camera is the same as that of the camera shown in FIG. 7 and thus is omitted.

First, if an user turns on the power of the camera in FIG. 7, the message for the present state of the camera appears on the display 5.

Next, the user selects a desired photography mode by manipulating the selector 4.

At that time, the mode of data which will be recorded into the memory card 1 can be selected; the field photographing mode and the frame photographing mode can be selected as well as the first to fourth modes as described in FIG. 1.

The field photographing mode is used to photograph a fast moving object and the frame photographing mode is the conventional mode of general electronic cameras as shown in FIG. 1.

After selecting the mode, the user presses a release button (not shown in figures) by half, the CPU 111 detects this and provides the electrical power to each circuit similar to the operation of the camera shown in FIG. 1.

Then the exposure sensor measures the intensity of an incident light and provides the measured data to the CPU 111.

Then the CPU 111 controls an iris according to the measured intensity of the incident light.

Also, the WB sensor 2 measures the external color temperature and the measures the data is provided as the information for the white balance to the CPU 111 through the interface circuit 112.

In this state, if the release button is completely pressed, the CPU 111 operates the shutter and controls the signal generator 113, the frame memory controller 500 and the field converter 300 according to the WB and exposure information, to perform the photographing and the signal processing operation.

Then the signal generator 113 provides control signals to the CCD driver 114, the sampler-and-holder 102, the amplifier 103, the A/D converter 106, the signal processor 107, the low-sensitivity pre-filter 108, the sub-sampler 109, the data compressor 110, the switching circuit 115, the frame memory controller 500, and the field converter 300 according to the speed of the shutter.

Accordingly, the CCD 101 is driven by the CCD driver 114, photographing the object and provides the image signal by the optical-to-electrical conversion.

The charge storage of the CCD 101 is generally divided into two types, i.e., field storage as shown in FIG. 8 (A) and frame storage as shown in FIG. 8 (B).

In the field storage case, when an odd field image signal is provided, charges in photosensitizers $P1 \sim P2$ are added at transmitters $T1+T2$, i.e., $I11+I21$, $I12+I22$, $I31+I41$; and $I32+I42$ as shown in FIG. 8 (A-a) and they are provided for the first 1/60 seconds.

Similarly, when an even field image signal is provided, the charges in the photosensitizers $P1 \sim P2$ are also added at the transmitters $T1 \sim T2$, i.e. $I11+I12$, I21+I31, I22+I32, I41+I51, I42+I52 as shown in FIG. 8 (A-b) and they are provided for the next 1/60 seconds.

In the frame storage case, when the odd field image signal is provided for the first 1/60 seconds, the charges in the photosensitizers P1 and P2 are provided in sequence of I11, I12, I31, I32 . . . , as shown in FIG. 8 (B-a).

Next, when the even field image signal is provided, the charges are provided in sequence of I11, I22, I41, I42 . . . , as shown in FIG. 8 (B-b).

FIGS. 8(A,B) show only a part of the CCD 101 and I11-I42 show optical-to-electrical converted charges at each pixel.

As the transmitting and providing method of the stored charge of the CCD 101, a frequency interleave scanning method as shown in FIG. 9 is used.

In FIG. 9(A,B) W. G. CY, and Ye represent the photosensitizing parts of the CCD 101 which are sensitized by receiving the white, green, cyan, and yellow components of the incident light, respectively.

First, the frequency interleave scanning method in the frame storage case shown in FIG. 8(B) is described.

In the scanning of the odd field for the first 1/60 seconds, photosensitized signals 01–04 are provided at odd lines L1, L3, L5, and L7 as the odd field image signal, as shown in FIG. 9(A).

Next, the frequency interleave scanning method in the field storage case shown in FIG. 8(A) is described.

In the scanning of the odd field for the first 1/60 seconds, different from the frame storage case the sum of adjacent two lines, i.e., sum signals o1' of L3 and L5, )2' of L3 and L4, 03' of L5 and L6, and 04' of L7 and L8 are provided as the image signal, as shown in FIG. 9 (B).

In the scanning of the even field for the next 1/60 seconds, sum signals E1' of L2 and L3, E2' of L4 and L5, E3' of L6 and L7 are provided, while two signals at L1 and L8 are provided without a summation, as shown in FIG. 9 (B).

FIGS. 9(A,B) also show a part of the CCD 101, which is composed of complementary color elements such as W, G, Cy, and Ye, but can be composed of R (red), G (Green), and B (Blue), and their arrangement can also be changed.

Thus, the CCD 101 photographs the object two times from the frame photography and processes the photographed signal every 1/60 second.

As described above, since the image signal provided from the CCD 101 is time-incontinuous, it is changed to a time-continuous signal by the sampler-and-holder 102 and is subsequently amplified by the amplifier 103, similar to that illustrated in FIG. 1.

The amplified signal is directly converted to a digital image signal without gamma and white compensation and low-pass filtering, different from that in FIG. 1.

The gamma and white compensation is performed only when the image signal is played back.

Figure 2:
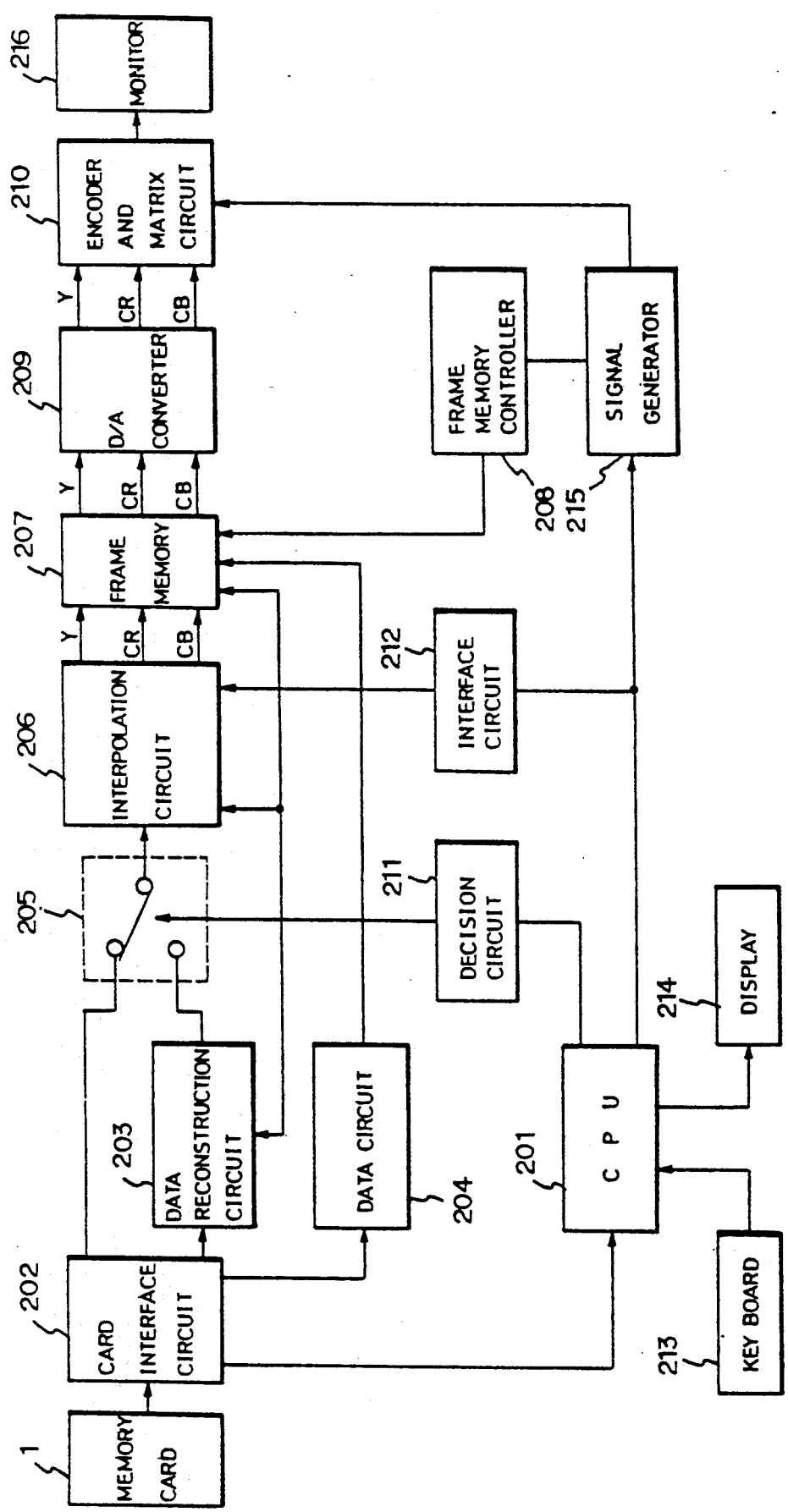
FIG. 2 is the circuit diagram of a player for playing back data processed by the camera in FIG. 1.
Figure 3:
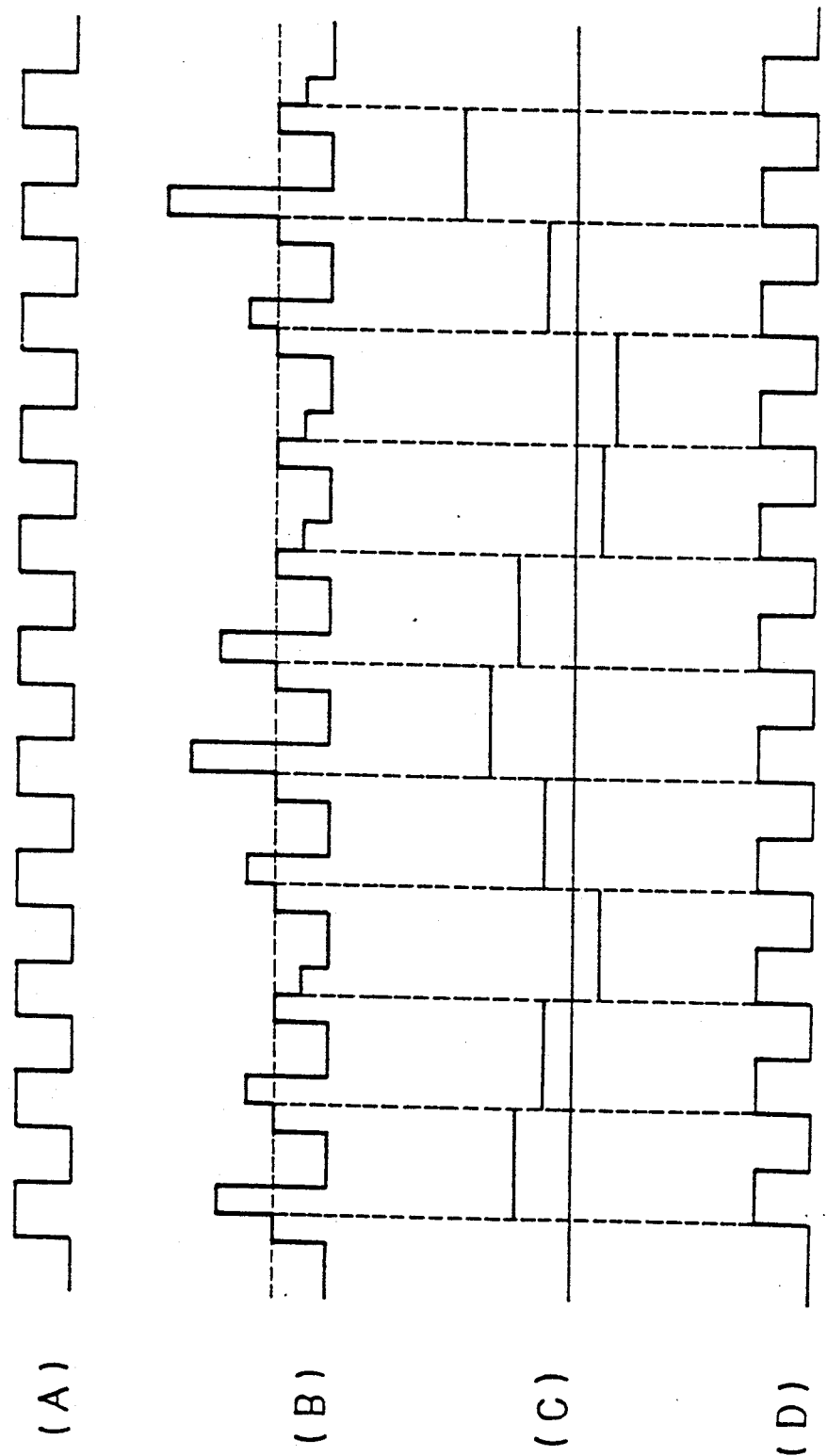
FIGS. 3(A-D) shows the output waveforms of a CCD 101 and a sampler-and-holder 102 in FIG. 1.
Figure 6A:
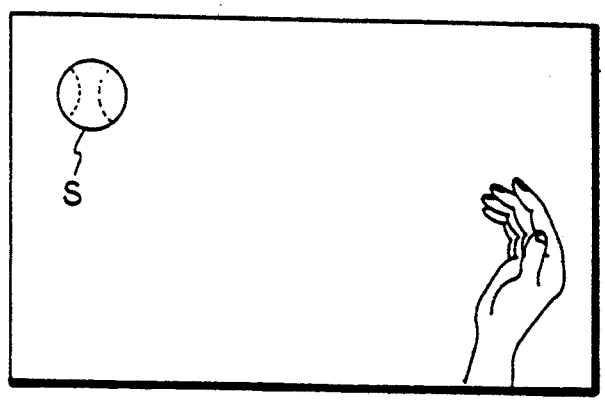
FIGS. 6(A,B) show the screens of photographing a fast moving object.
Figure 6B:
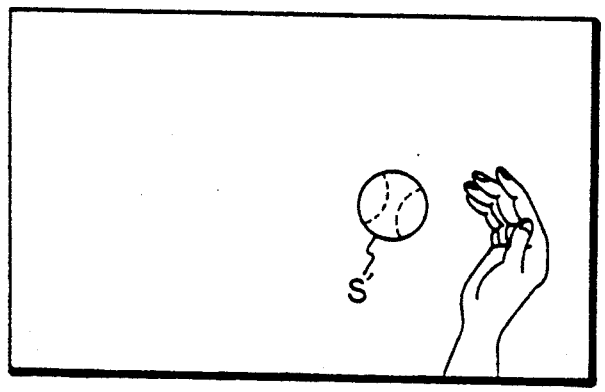

The reason is that if the data is compressed and recorded after compensation as shown in FIG. 1, the compensation effect is degraded by the data compression and extension process even though the interpolation is performed when the data is played back, as shown in FIG. 2.

On the other hand, the frame memory controller 500 stores the digital image signal from the A/D converter 106 to the first field memory 200 or the second field memory 400 according to the field or frame photographing mode of the selector 4 selected by user manipulation, by the control of the CPU 11 or the output control signal of the signal generator 113.

When the frame photographing mode is selected, i.e., the slowly moving object is photographed, the odd field image signal which is photographed by the CCD 101 for the first 1/60 seconds and signal-processed, is stored in to the first field memory 200 as the first field signal and the even field image signal for the next 1/60 seconds, is stored into the second field memory 400 as the second field signal.

On the other hand, if the field photographing mode is selected, i.e., the fast moving object is photographed, only the odd field image for the first 1/60 seconds is stored as the first field signal in the first field memory 200.

This is achieved by controlling the driving of the CCD 101, the sampler-and-holder 102, the A/D converter 106, the first field memory 200, or the second field memory 400.

The image signal which is photographed according to the field or frame photographing mode and next stored into the first field memory 200 or the second field memory 400, is signal-processed by the following two ways.

First, if the frame photographing mode is selected, the first field image signal in the first field memory 200 is read by the frame memory, controller 500 and is divided into luminance signal Y1 and two color-difference signals CR1 and CB1 by the signal processor 107.

Next, the second field image signal in the second field memory 400 is read and is divided into a luminance signal Y1 and two color-difference signals CR1 and CB2.

At this time, another processing method that the first horizontal scanning line of the first field image signal is first provided to the signal processor 107 and next the first horizontal scanning line of the second field image signal is provided to the signal processor 107, i.e., the first and second field image signals are in turn processed one horizontal scanning line by one horizontal scanning line can be applicable.

Second, if the field photographing mode is selected, since only the first field image signal is stored in the first field memory 200 and the second field memory had no image signal, the first field image signal is converted to a second field image signal by the field converter 300 and is stored into the second field memory 400.

A method of converting the first field image signal to the second field image signal is as follows.

First, when the first field image signal stored in the first field memory 200 is the odd field image signal provided from the CCD 101 in the frame storage case as shown in FIG. 9 (A), it is converted to the even field image signals by following equations.

$$E1 = \frac{a \times 01 + b \times 03}{c} \quad (1)$$

$$E2 = \frac{a \times 02 + b \times 04}{c} \quad (2)$$

$$E3 = \frac{a \times 03 + b \times 05}{c} \quad (3)$$

$$E4 = \frac{a \times 04 + b \times 06}{c} \quad (4)$$

where $c = a+b$ and $a > b$.

Eq. (1) means that since the photosensitizing part L2 is not located at the middle between 01 and 03, a larger correlation part of image is emphasized by an arithmetic operation to provide an even field signal E1.

Similarly, in Eq. (2)~(4), large correlation parts of image are emphasized to provide the even field signals E2, E3, and E4, respectively.

The weighting factors a and b are properly chosen by simulations and experiments.

The above method of converting the odd field image signal in the frame storage case as shown in FIG. 9(A) to the even field image signal is only an example and can be changed according to desired results.

Also, in Eq. (3) and (4), 05 and 06 represent the photosensitized signals at L9 and L11 which are not shown in FIG. 9.

On the other hand, if the first field image signal stored in the first field memory 200 is the odd field image signal provided from the CCD 101 in the field storage structure as shown in FIG. 9 (B), it is converted to even field image signals by following equations;

$$E1' = \frac{01' + 02'}{2} \quad (5)$$

$$E2' = \frac{02' + 03'}{2} \quad (6)$$

$$E3' = \frac{03' + 04'}{2} \quad (7)$$

Eq. (5) means that since the signal E1' is located at the middle between 01' and 02', 01' and 02' are averaged to provide the even field image signal E1'.

Similarly, in Eqs. (6) and (7), 02' and 03', and 03' and 04' are respectively averaged to provide the even field image signals E2' and E3.

Also, the above method of converting the odd field image signal in the field storage case to the even field image signal is only an example and can be changed according to desirable results similar to the frame storage case.

Eq. (1)~(4) or (5)~(7) show only a partial example of the conversion from the odd to even field image signal of one field.

By such a method, all odd field image signals corresponding to the amount of one field are converted to the even field image signals.

If the first field image signal stored in the first field memory 200 is converted to the second field image signal by the method described above by the field converter 300 according to the control of the CPU 111 and the control signal of the signal generator 113, and is next stored into the second field memory 400, the first and second field image signals are processed as the frame photographing mode and are divided into the luminance signal Y1 and the color-difference signals.

Then the luminance signal Y1 and the color-difference signals are processed according the mode of data format selected by the selector 4 as described in FIG. 1 and are recorded into the memory card 1.

Also, different from the camera in FIG. 1, the color temperature data, flash data, exposure data and shutter speed data are recorded into the memory card 1 according to the control of the CPU 111, together with the image data.

Figure 10:
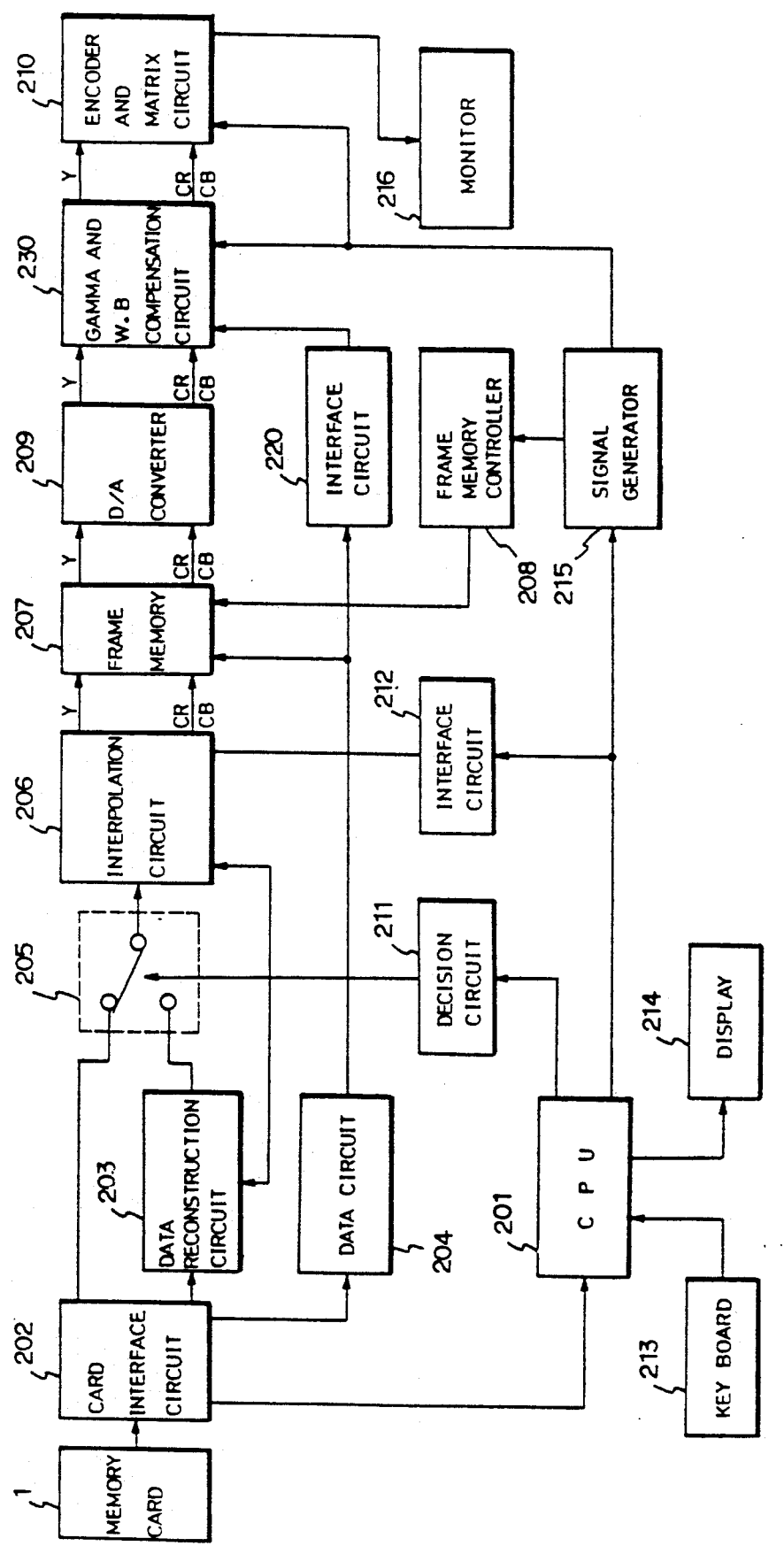
FIG. 10 is the circuit diagram of a player for playing back data processed by the digital still video camera in FIG. 7 according to the present invention.

FIG. 10 shows the circuit diagram of a player for playing back the image data recorded in the memory card 1 by the camera circuit shown in FIG. 7.

The player in FIG. 10 is different from that in FIG. 2 only in that a gamma and WB compensation circuit 230 is connected between a D/A converter 209 and an encoder and matrix circuit 210 to perform the gamma and WB compensation of the luminance signal Y1' and the color difference signals of the D/A converter 209 according to the information provided from a data circuit 204 through an interface circuit 220 and provides the compensated signals to the encoder and matrix circuit 210.

The operation of FIG. 10 is now described.

The process of reconstructing the image data recorded in the memory card 1 and converting it to the analog signal by using the D/A converter 209 is the same as that in FIG. 2 and thus is omitted.

Since the memory card 1 also has the information for the gamma and WB compensation recorded by the camera circuit shown in FIG. 7, if the playback is performed, the gamma and W.B compensation circuit 230 receives the information in the memory card 1 through the interface circuit 220 and performs the gamma and W.B compensation about the luminance signal Y1 and the color-difference signals CR and CB provided from the D/A converter 209, according to the control signals of the signal generator 215.

Next, the gamma and WB compensation circuit 230 provides the compensated signals to the encoder and matrix circuit 210.

Then, the encoder and matrix circuit 210 converts the output signals of the gamma and WB compensation circuit 230 to a composite image signal or R, G, and B component signals and displays it on the monitor 216.

As described above, the player shown in FIG. 10 can prevent the degradation of the compensation effect due to the data compression in the recording process and the data reconstruction in the playback process, by performing the gamma and WB compensation in the playback process, different from the digital still video system shown in FIG. 1 and FIG. 2.

As mentioned hereinabove, the present invention, in the digital still video camera, generates one frame of image signal by one field photography when photographing the fast moving object and records it after signal processing, thereby providing a stable screen without tremble on the monitor when playing back the recorded image signal.

What is claimed is:

1. A field interpolation circuit, comprising:
   a memory card having a predetermined memory size for recording and playing back data;
   a selector for selecting one of a plurality of photograph modes and one of a plurality of data compression modes to provide selected modes;
   a processor for controlling a system in dependence upon the selected modes;
   a signal generator responsive to said processor, for providing a plurality of control signals in dependence upon a shutter speed;
   a photographing device for photographing an object to provide a continuous image signal in dependence upon reception of said control signals;
   an analog-to-digital converter for converting the output signal of the photographing device to a digital image signal in dependence upon reception of said control signals;
   a first field memory for storing and providing a first field of the digital image signal in dependence upon reception of said control signals;

a field converter responsive to said processor, for converting the first field image signal to a second field image signal by an arithmetic operation in dependence upon reception of said control signals;

a second field memory for selectively storing and providing the second field of the digital image signal in dependence upon reception of said control signals;

a frame memory controller responsive to said processor, for controlling the first and second field memories;

a signal converter responsive to said processor, for dividing the digital image signal provided from the first and second field memories into a luminance signal and a color-difference signal in dependence upon reception of said control signals; and a recording device responsive to said processor, for recording the output image signal of the signal converter into the memory card.

2. A field interpolation circuit according to claim 1, the photographing device is a charge-coupled device having a frame storage structure.

3. A field interpolation circuit according to claim 1, the photographing device is a charge-coupled device having a field storage structure.

4. A field interpolation circuit, including a CCD for controlling an overall system, a signal generator, connected to the CPU through an interface circuit, from providing system control signals, a photographing means, including a photographing device, for photographing an object by using the photographing device according to the control signals of the signal generator and for providing a first field image signal after converting charges stored at a frame by the photography to an electrical image signal, an A/D converter for converting the first field image signal provided from the photographing means to a digital image signal according to the control signals of the signal generator, a first field memory for storing and providing the digital first field image signal according to the control signals, a field converter for converting the first field image signal stored in the first field memory to a second field image signal by arithmetic operations and providing it, a second field memory for storing and providing the second field image signal provided from the field converter according to the control signals, and a frame memory controller for controlling the first and second field memories according to the control of the CPU and the control signals of the signal generator, comprising:

a photographing process for photographing an object by using a photographing device such as CCD and providing a first field image signal after converting the frame-stored charge of the photographing device to an electrical image signal, a digital converting process from converting the first-field image signal in the photographing process to a digital image signal by using the A/D converter, a storing process for storing the digital first-field image signal in the digital converting process into the first field memory, a field interpolating process for emphasizing a larger correlative side of image signals on upper and lower horizontal lines adjacent to the first field image signal by logic arithmetic operation and for storing a second field image signal into the second field memory after converting the first field image signal to the second field image signal, and an output process for providing the first and second field image signals stored in the storing process and the field interpolating process.

5. A field interpolation method according to claim 4, wherein the photographing process photographs an object and provides a first field image signal after converting charges stored at a field to an electrical image signal.

6. A field interpolation method according to claim 4, wherein a first field image signal stored by the storing means is converted to a second field image signal by the overagging operation of image signals on upper and lower horizontal scanning lines adjacent to the first field image signal and the second field image signal is stored into a second field memory.

7. A field interpolation circuit for a digital video recorder, comprising:

photograph means having a frame storage structure and a field storage structure, for photographing an image to provide image signals representative of contents of said image in a first field image signal and a second field image signal;

frame memory controller means having a first field memory and a second field memory, for storing the first field image signal in said first field memory and the second field image signal in said second field memory, in dependence upon selected photographic modes representative of one of a frame mode and a field mode;

field converter means for converting the first field image signal stored in said first field memory into the second field image signal in dependence upon said selected photographic modes;

signal processor means coupled to receive output image signals from said first and second field memories, for processing the received image signals in dependence upon selected data compression modes to provide processed signals; and means for recording said processed signals into a memory, and for reproducing the recorded signals from said memory.

8. The field interpolation circuit as claimed in claim 7, wherein said field converter means converts the first field image signal into the second field image signal by averaging upper and lower horizontal scanning lines of said first field image signal to provide said second field image signal in dependence upon said photographic modes.

9. A field interpolation circuit, comprising:

selector means for selecting one of selected photographic modes representative of a field photo-mode and a frame photo-mode, and one of data compression modes representative of a plurality of compression factors;

photograph means having a frame storage structure and a field storage structure, for photographing an image to provide image signals representative of contents of said image in a first field image signal and a second field image signal in dependence upon said selected photographic modes;

converter means for converting said image signals into digital signals having a first field digital signal and a second field digital signal;

frame memory controller means having a first field memory and a second field memory, for storing said first field digital signal in said first field memory and the second field digital signal in said second field memory in dependence upon said selected photographic modes;

field converter means for converting the first field digital signal stored in said first field memory into the second field image signal in dependence upon said selected photographic modes;

signal processor means coupled to receive output digital signals from said first and second field memories, for processing the received digital signals in dependence upon selected data compression modes to provide processed signals; and means for recording said processed signals into a memory card, and for reproducing the recorded signals from said memory card.

10. The field interpolation circuit as claimed in claim 9, wherein said field converter means converts the first field image signal into the second field image signal by averaging upper and lower horizontal scanning lines of said first field image signal to provide said second field image signal in dependence upon said selected one of said plurality of photographic modes.

* * * * *

UNITED STATES PATENT AND TRADEMARK OFFICE
CERTIFICATE OF CORRECTION

PATENT NO. : 5,233,411

DATED : August 3, 1993

INVENTOR(S) : Seok- Hoon Nam, et al

It is certified that error appears in the above-indentified patent and that said Letters Patent is hereby corrected as shown below:

Column 1,

Line 39,    change "LPI" to --LPF--;

Column 2,

Line 67,    change "use" to --used--;

UNITED STATES PATENT AND TRADEMARK OFFICE
CERTIFICATE OF CORRECTION

PATENT NO. : 5,233,411
DATED : August 3, 1993
INVENTOR(S) : Seok-Hoon Nam et al

It is certified that error appears in the above-indentified patent and that said Letters Patent is hereby corrected as shown below:

Column 7,

Line 18,      change "devices" to --device--;

Line 34,      after "signal", insert --of the digital image signal--;

Line 35,      delete "of the digital image signal";

Column 9,

Line 18,      change "CY" to --Cy--.

Signed and Sealed this

Twenty-seventh Day of September, 1994

Attest:

BRUCE LEHMAN

*Attesting Officer*      *Commissioner of Patents and Trademarks*